United States Patent
Jung et al.

(10) Patent No.: US 9,215,740 B2
(45) Date of Patent: Dec. 15, 2015

(54) METHOD AND APPARATUS FOR GENERATING CONTROL PACKET

(75) Inventors: Soo-yeon Jung, Seoul (KR);
Hyuk-choon Kwon, Seoul (KR);
Hae-young Jun, Seoul (KR); Ho-dong Kim, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 260 days.

(21) Appl. No.: 13/269,101

(22) Filed: Oct. 7, 2011

(65) Prior Publication Data
US 2012/0087278 A1 Apr. 12, 2012

Related U.S. Application Data

(60) Provisional application No. 61/406,240, filed on Oct. 25, 2010, provisional application No. 61/410,167, filed on Nov. 4, 2010, provisional application No. 61/391,186, filed on Oct. 8, 2010.

(30) Foreign Application Priority Data

Jul. 18, 2011 (KR) .................. 10-2011-0071087

(51) Int. Cl.
| | | |
|---|---|---|
| H04W 4/00 | (2009.01) | |
| H04W 76/02 | (2009.01) | |
| H04L 5/00 | (2006.01) | |
| H04L 25/02 | (2006.01) | |
| H04L 27/26 | (2006.01) | |

(52) U.S. Cl.
CPC ............ *H04W 76/025* (2013.01); *H04L 5/006* (2013.01); *H04L 25/0204* (2013.01); *H04L 27/2647* (2013.01)

(58) Field of Classification Search
CPC ... H04L 27/2627; H04L 1/0041; H04L 27/36; H04L 5/023; H04L 76/025; H04L 5/006; H04L 25/0204; H04L 27/2646; H04L 27/2647; H04L 72/0453
USPC .............. 370/254, 322, 342, 395.5, 432, 437, 370/439, 464–467, 208, 252, 328, 329
See application file for complete search history.

(56) References Cited

U.S. PATENT DOCUMENTS

| | | | | |
|---|---|---|---|---|
| 2006/0221998 | A1* | 10/2006 | Livet et al. ................... | 370/464 |
| 2007/0104087 | A1* | 5/2007 | Tee et al. ...................... | 370/208 |
| 2009/0034479 | A1* | 2/2009 | Wakayama et al. .......... | 370/332 |
| 2011/0152970 | A1* | 6/2011 | Jollota et al. ................. | 607/60 |

FOREIGN PATENT DOCUMENTS

CN 101151834 A 3/2008

OTHER PUBLICATIONS

Carlos Cordeiro, PHY/MAC Complete Proposal Specification, May 2010, IEEE.*

(Continued)

*Primary Examiner* — Kwang B Yao
*Assistant Examiner* — Harun Chowdhury
(74) *Attorney, Agent, or Firm* — Sughrue Mion, PLLC

(57) ABSTRACT

A method of generating a control packet by using a first apparatus including a plurality of medium access control (MAC) layers, the method comprising: generating dynamic tone pairing (DTP) reception setup information indicating whether to receive DTP information for each of a plurality of links from a second apparatus; and generating a control packet including the DTP reception setup information.

25 Claims, 7 Drawing Sheets

(56) References Cited

OTHER PUBLICATIONS

Vish Ponnampalam, Mediatek, et al, "OFDM Proposal", May 15, 2010, see slides 18-20., 15 pages total; doc. IEE 802.11-10-0440r2; 15 pages total.

Carlos Cordeiro, Intel, et al., "PHY/MAC Complete Proposal Specification", May 18, 2010, see pp. 79-81 and 312-315; doc.: IEEE 802-11-10/0433r2; 336 pages total.

Communication dated Apr. 19, 2012 issued by the International Searching Authority in corresponding International Application No. PCT/KR2011/007429.

Communication dated Jun. 28, 2013, issued by the Mexican Institute of Industrial Property in counterpart Mexican Application No. MX/a/2013/003814.

Communication dated Nov. 8, 2013, issued by the Mexican Patent Office in corresponding Application No. MX/a/2013/003814.

Communication issued on Apr. 21, 2015 by The State Intellectual Property Office of PR China in related Application No. 201180059373.0.

Anonymous, "WGA-D1.0.2", TWG MAC Editor Solomon Traninin, Carlos Cordeiro TWG PHY Editor Assaf Kasher Company: Intel (1), Sep. 20, 2010, 340 total pages.

* cited by examiner

FIG. 3

| 216a | 216b | 216c | 216d | 216g | 216f |
|---|---|---|---|---|---|
| MMAE Owner | Single AID | MA-STA Power mode | BeamLink cluster | Common Link Measurement Report | Reserved |
| B0-B1 | B2 | B3 | B4 | B5 | B6-B7 |

BiT:

METHOD AND APPARATUS FOR GENERATING CONTROL PACKET

CROSS-REFERENCE TO RELATED PATENT APPLICATION

This application claims priority from Korean Patent Application No. 10-2011-0071087, filed on Jul. 18, 2011, in the Korean Intellectual Property Office, and the benefit of U.S. Provisional Patent Application No. 61/391,186, filed on Oct. 8, 2010, U.S. Provisional Patent Application No. 61/406,240, filed on Oct. 25, 2010, and U.S. Provisional Patent Application No. 61/410,167, filed on Nov. 4, 2010, in the U.S. Patent and Trademark Office, the disclosures of which are incorporated herein in their entirety by reference.

BACKGROUND

1. Field

Apparatuses and methods consistent with exemplary embodiments exemplary embodiments relate to generating a control packet, and more particularly, to generating a control packet, in which an apparatus having a plurality of medium access control (MAC) layers generates a control packet.

2. Description of the Related Art

According to the related art, a device uses a medium access control (MAC) layer and a physical (PHY) layer when performing communication in a network. However, as communication technology is developed, a device performing communication using a PHY layer and a plurality of MAC layers has been suggested. Thus, there is a need for new and improved methods and apparatuses in this area.

SUMMARY

One or more exemplary embodiments of the present inventive concept provide methods and apparatuses for generating a control packet, wherein an apparatus having a plurality of MAC layers generates a control packet.

One or more exemplary embodiments may overcome the above disadvantages and other disadvantages not described above. However, it is understood that one or more exemplary embodiment are not required to overcome the disadvantages described above, and may not overcome any of the problems described above.

According to an aspect of an exemplary embodiment there is provided a method of generating a control packet by a first apparatus which communicates with a second apparatus via a plurality of medium access control (MAC) layers, wherein the method may include: generating dynamic tone pairing (DTP) reception setup information indicating whether to receive DTP information for each of a plurality of links from the second apparatus; and generating a control packet including the DTP reception setup information.

If the DTP reception setup information is set such that the DTP information is to be received for each of the plurality of links, the DTP information is received while receiving the DTP information from the second apparatus.

The method may further include transmitting the generated control packet by the first apparatus to the second apparatus.

The method may further include: transmitting a DTP information request requesting transmission of the DTP information to the second apparatus for each of the plurality of links, if the DTP reception setup information is set such that the DTP information is received for each of the plurality of links; and receiving the DTP information from the second apparatus for each of the plurality of links.

The method may further include: receiving a DTP information request requesting transmission of the DTP information from the second apparatus for each of the plurality of links, if the DTP reception setup information is set such that the DTP information is received for each of the plurality of links; generating the DTP information for each of the plurality of links; and transmitting the generated DTP information for each of the plurality of links to the second apparatus.

The DTP information may further include at least one of first information about a first time when DTP information is transmitted, second information about a second time when the DTP information is generated, and third information about a third time when the DTP information request is received.

The control packet may further include beam forming information indicating whether to perform beam forming for each of the plurality of links.

The control packet may further include link quality report information indicating whether to receive information about link quality for each of the plurality of links from the second apparatus.

According to an aspect of an exemplary embodiment, there is provided control packet generating apparatus having a plurality of medium access control (MAC) layers, wherein the apparatus may include: an information generating unit which generates dynamic tone pairing (DTP) reception setup information indicating whether to receive DTP information for each of a plurality of links from the second apparatus; and a packet generating unit generating a control packet including DTP setup information.

The control packet generating apparatus may further include a reception unit which receives DTP information from the other apparatus, wherein when the DTP reception setup information is set such that the DTP information is to be received for each of the plurality of links, the DTP information generated for each of the plurality of links is received while the reception unit receives the DTP information from the second apparatus.

The control packet generating apparatus may further include a transmitting unit which transmits the generated control packet to the second apparatus.

The control packet generating apparatus may further include: a transmitting unit which transmits a DTP information request for requesting transmission of the DTP information to the second apparatus for each of the plurality of links, when the DTP reception setup information is set such that the DTP information about the DTP is received for each of the plurality of links; and a receiving unit which receives the DTP information from the second apparatus for each of the plurality of links.

The control packet generating apparatus may further include: a receiving unit which receives a DTP information request for requesting transmission of the DTP information from the second apparatus for each of the plurality of links, when the DTP reception setup information is set such that the DTP information is received for each of the plurality of links; and a transmitting unit which receives the generated DTP information for each of the plurality of links to the second apparatus, when the information generating unit generates the DTP information for each of the plurality of links.

The DTP information may further include at least one of first information about a first time when the DTP information is transmitted, second information about a second time when the DTP information is generated, and third information about a third time when the DTP information request is received.

The control packet may further include beam forming information indicating whether to perform beam forming for each of the plurality of links.

The control packet may further include link quality report information indicating whether to receive information about link quality for each of the plurality of links from the second apparatus.

According to an aspect of an exemplary embodiment, there is provided computer readable recording medium having embodied thereon a program for executing method of generating a control packet by a first apparatus which communicates with a second apparatus via a plurality of medium access control (MAC) layers, wherein the method may include: generating dynamic tone pairing (DTP) reception setup information indicating whether to receive DTP information for each of a plurality of links from the second apparatus; and generating a control packet including the DTP reception setup information.

According to an aspect of an exemplary embodiment, there is provided a method of receiving information about DTP by using a first device including a plurality of medium access control (MAC) layers from a second device, wherein the method may include: receiving the information about the dynamic tone pairing (DTP) regarding one of the plurality of MAC layers from the second device; checking DTP reception setup indicating whether to receive DTP information for each of the plurality of links; and selectively receiving the DTP information, wherein the DTP information is regarding MAC layers other than the one of the plurality of MAC layers, based on a result of the checking of the DTP reception setup.

The receiving the DTP information regarding one of the plurality of MAC layers from the second device may include: transmitting to the second device a DTP information request for requesting transmission of the DTP information; and receiving the DTP information corresponding to the DTP information request from the second device.

The selective receiving of the information about the DTP regarding the rest of the MAC layers may include: if the DTP reception setup is set such that the DTP information is received for each of a plurality of links, the MAC layers other than the one of the plurality of MAC layers receive the DTP information generated for each of the plurality of links, and when the DTP reception setup is set such that one piece of DTP information is received for all MAC layers, the MAC layers other than the one of the plurality of MAC layers do not receive the DTP information.

According to an aspect of an exemplary embodiment, there is provided an information receiving apparatus that is mounted in a first device having a plurality of medium access control (MAC) layers and receives information from a second device having at least one MAC layer connected to the plurality of MAC layers via a plurality of links, wherein the apparatus may include: an information obtaining unit which obtains dynamic tone pairing (DTP) information regarding one of the plurality of MAC layers from the second device; and a checking unit which checks a DTP reception setup indicating whether to receive the DTP information for each of the plurality of links; and a control unit which controls the receiving unit to selectively receive the DTP information regarding MAC layers other than the one of the plurality of MAC layers based on an output of the checking unit.

The information obtaining unit may transmit a DTP information request for requesting transmission of the DTP information to the second device, and receives the DTP information corresponding to the DTP information request from the second device.

If the DTP reception setup is set such that the DTP information is to be received for each of the plurality of links, the control unit may control the information obtaining unit to receive the DTP information about the DTP generated for each of the plurality of links via MAC layers other than the one of the plurality of MAC layers, and if the DTP reception setup is set such that one piece of information about the DTP is received for all MAC layers, the MAC layers other than the one of the plurality of MAC layers do not receive the DTP information.

BRIEF DESCRIPTION OF THE DRAWINGS

The above and/or other aspects will become more apparent by describing in detail exemplary embodiments with reference to the attached drawings in which:

FIG. 3 is a view for explaining a multiple MAC address element (MMAE) control field according to another exemplary embodiment;

DETAILED DESCRIPTION OF THE INVENTIVE CONCEPT

Exemplary embodiments will now be described more fully with reference to the accompanying drawings.

Figure 1:
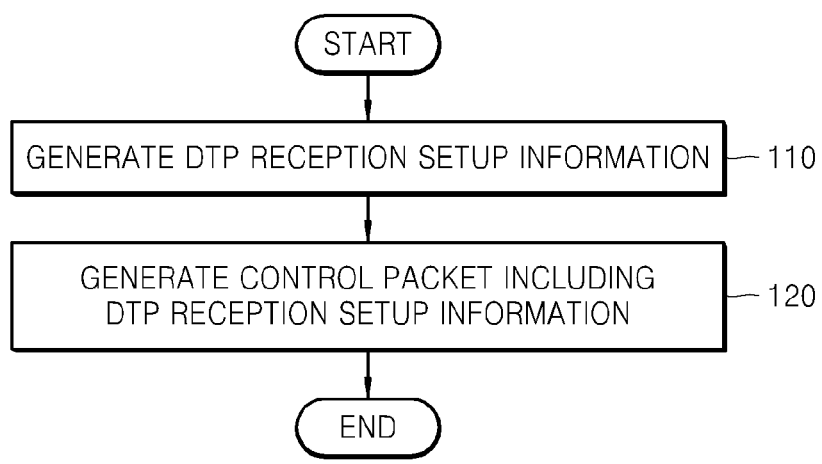
FIG. 1 is a flowchart illustrating a method of generating a control packet, according to an exemplary embodiment.

FIG. 1 is a flowchart illustrating a method of generating a control packet, according to an exemplary embodiment;

Here, it is assumed that a control packet generating apparatus according to an exemplary embodiment has a plurality of medium access control (MAC) layers.

In operation 110, the control packet generating apparatus generates dynamic tone pairing (DTP) reception setup information indicating whether to receive information about DTP for each of a plurality of links from another apparatus having at least one MAC layer that is connected to the plurality of MAC layers of the control packet generating apparatus itself via the plurality of links.

DTP refers to dynamically allocating identical data to two different tones in an orthogonal frequency-division multiplexing (OFDM) method. The tones are generated by dividing a predetermined frequency bandwidth into identical intervals that are usable in data transmission; when allocating data to be transmitted, to tones, to transmit the data, some of the tones may have weak intensity of signal, and for this reason, an identical piece of data is allocated to two different tones, which is called tone pairing. Moreover, static tone pairing refers to tone pairing, in which data has intervals corresponding to the same number of tones between the two allocated tones regarding all of data to be transmitted, and DTP refers to tone pairing, in which data has intervals corresponding to different numbers of tones between the two allocated tones for each data to be transmitted.

As the static tone pairing is well known in the related art, a detailed description thereof will not be provided here, and also, as the DTP is described in Wireless Gigabit Alliance (WiGig) D 1.0.3, a detailed description thereof will be omitted.

In operation 120, a control packet including the DTP reception setup information is generated. The control packet may be one of a probe request packet, an association request packet, an announcement packet, and an information response packet.

In addition, the control packet may further include beam forming information indicating whether to perform beam forming for each of a plurality of links and link quality report information indicating whether to receive information about a link quality for each of the plurality of links from the other apparatus.

Meanwhile, according to another exemplary embodiment, the control packet may include a multiple MAC address element including at least one of DTP reception setup information, beam forming information, and link quality reporting information. A structure of the multiple MAC address element will be described later with reference to FIG. 2.

The control packet including DTP reception setup information generated as described above may be used in notifying the other apparatus of whether the control packet generating apparatus is to receive information about DTP for each of the plurality of links or only one piece of information about DTP, and the control packet generating apparatus may control DTP reporting methods of other apparatus by using the control packet including the DTP reception setup information.

According to another exemplary embodiment, the control packet generating apparatus may further transmit a control packet including the DTP reception setup information to other apparatuses.

Figure 2:
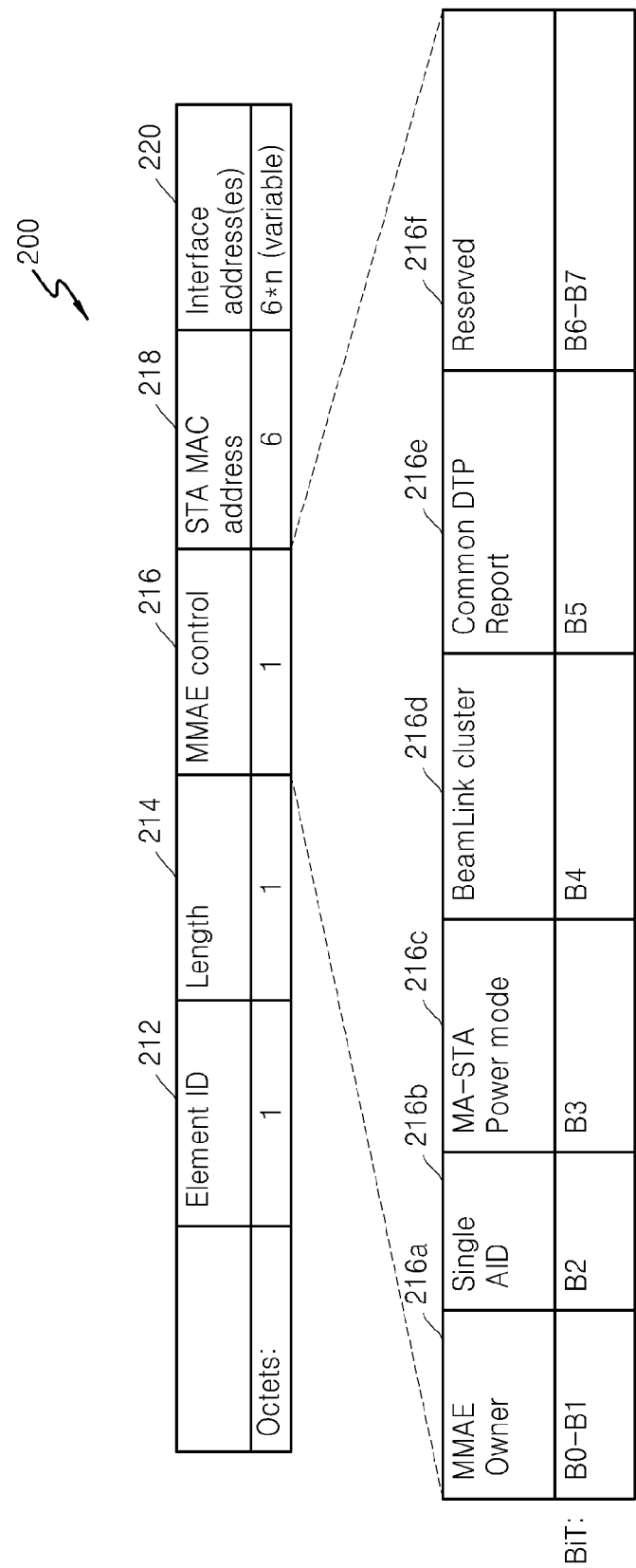
FIG. 2 is a view for explaining an MAC address element according to an exemplary embodiment.

FIG. 2 is a view for explaining a multiple MAC address element 200 according to an exemplary embodiment.

Referring to FIG. 2, the multiple MAC address element (MMAE) 200 includes an element ID field 212, a length field 214, a MMAE control field 216, a station MAC address field 218, and an interface address field 220.

The element ID field 212 includes an ID for identifying the MMAE 200.

The length field 214 denotes a length of the MMAE 200.

The MMAE control field 216 includes information used to control an operation of a control packet generating apparatus having a plurality of MAC layers or an operation of other apparatuses that receive a control packet generated by the control packet generating apparatus.

Referring to FIG. 2, the MMAE control field 216 includes a MMAE owner field 216a, a single association identifier (AID) field 216b, a multiple MAC station set (MA-STA) power mode field 216c, a beam link cluster field 216d, a common DTP report field 216e, and a reservation field 216f.

The MMAE owner field 216a denotes whether the control packet generating apparatus having a plurality of MAC layers is an access point (AP), a personal basic service set control point (PCP), or neither an AP nor a PCP. According to another exemplary embodiment, the MMAE owner field 216a may indicate that an apparatus having a plurality of MAC layers does not exist.

The single AID field 216b indicates whether identification numbers are to be given to each of the links formed between the plurality of MAC layers of the control packet generating apparatus and at least one MAC layer of other apparatus.

According to another exemplary embodiment, a link formed between the MAC layers of the control packet generating apparatus and the at least one MAC layer of another apparatus may be referred to as an engaged link, and all engaged links between the control packet generating apparatus and other apparatuses may be referred to as an engaged link cluster.

The MA-STA power mode field 216c denotes a power mode of the control packet generating apparatus having a plurality of MAC layers.

For example, if a value of the MA-STA power mode field 216c is set as 0, and when one of the MAC layers moves to a sleep mode from an awake mode, all the other MAC layers also move to a sleep mode, and the control packet generating apparatus may be in an awake mode only if all of the MAC layers are awakened. Also, if a value of the MA-STA power mode field 216c is set as 1, and when one of the MAC layers moves to an awake mode from a sleep mode, all the other MAC layers also move to the awake mode, and the control packet generating apparatus may be in the sleep mode only if all of the MAC layers are in the sleep mode.

The beam link cluster field 216d includes beam forming information indicating whether beam forming is to be conducted for each of the plurality of links between the control packet generating apparatus and other apparatuses.

For example, if a value of the beam link cluster field 216d is set as 0, beam forming is conducted for each of the plurality of MAC layers of the control packet generating apparatus, and if a value of the beam link cluster field 216d is set as 1, beam forming may be conducted only once for all of the MAC layers of the control packet generating apparatus.

The common DTP report field 216e includes DTP reception setup information indicating whether to receive information about the DTP for each of the plurality of links between the control packet generating apparatus and other apparatuses.

For example, if a value of the common DTP report field 216e is set as 0, information about the DTP may be received for each of the plurality of links between the control packet generating apparatus and other apparatuses, and if a value of the common DTP report field 216e is set as 1, just one piece of information about DTP may be received for all of the links.

Thus, if the value of the common DTP report field 216e is set as 1, the information about DTP is shared by all the links between the control packet generating apparatus and other apparatuses.

However, according to another exemplary embodiment, the common DTP report field 216e may be omitted, and the beam link cluster field 216d may include DTP reception setup information.

The reservation field 216f is left blank for future use.

According to another exemplary embodiment, the MMAE control field 216 may have a different structure, which will be described later with reference to FIG. 3.

The station MAC address field 218 denotes a MAC address of a station that has generated the MMAE 200.

The interface address field 220 further includes at least one MAC address that is necessary to identify a station that has generated the MMAE 200 in addition to the MAC address of the station of the station MAC address field 218.

FIG. 3 is a view for explaining a MMAE control field 216 according to another exemplary embodiment.

Referring to FIG. 3, the MMAE control field 216 includes a MMAE owner field 216a, a single AID field 216b, a MA-STA power mode field 216c, a beam link cluster field 216d, a common link measurement link report field 216g, and a reservation field 216f.

The MMAE owner field 216a, the single AID field 216b, the MA-STA power mode field 216c, the beam link cluster field 216d, and the reservation field 216f of FIG. 3 are respectively the same as the MMAE owner field 216a, the single AID field 216b, the MA-STA power mode field 216c, the beam link cluster field 216d, and the reservation field 216f of FIG. 2, and thus a description thereof will be omitted here.

The common link measurement link report field 216g includes link quality report information indicating whether to receive information about a link quality for each of the plurality of links between the control packet generating apparatus and other apparatuses.

Figure 4:
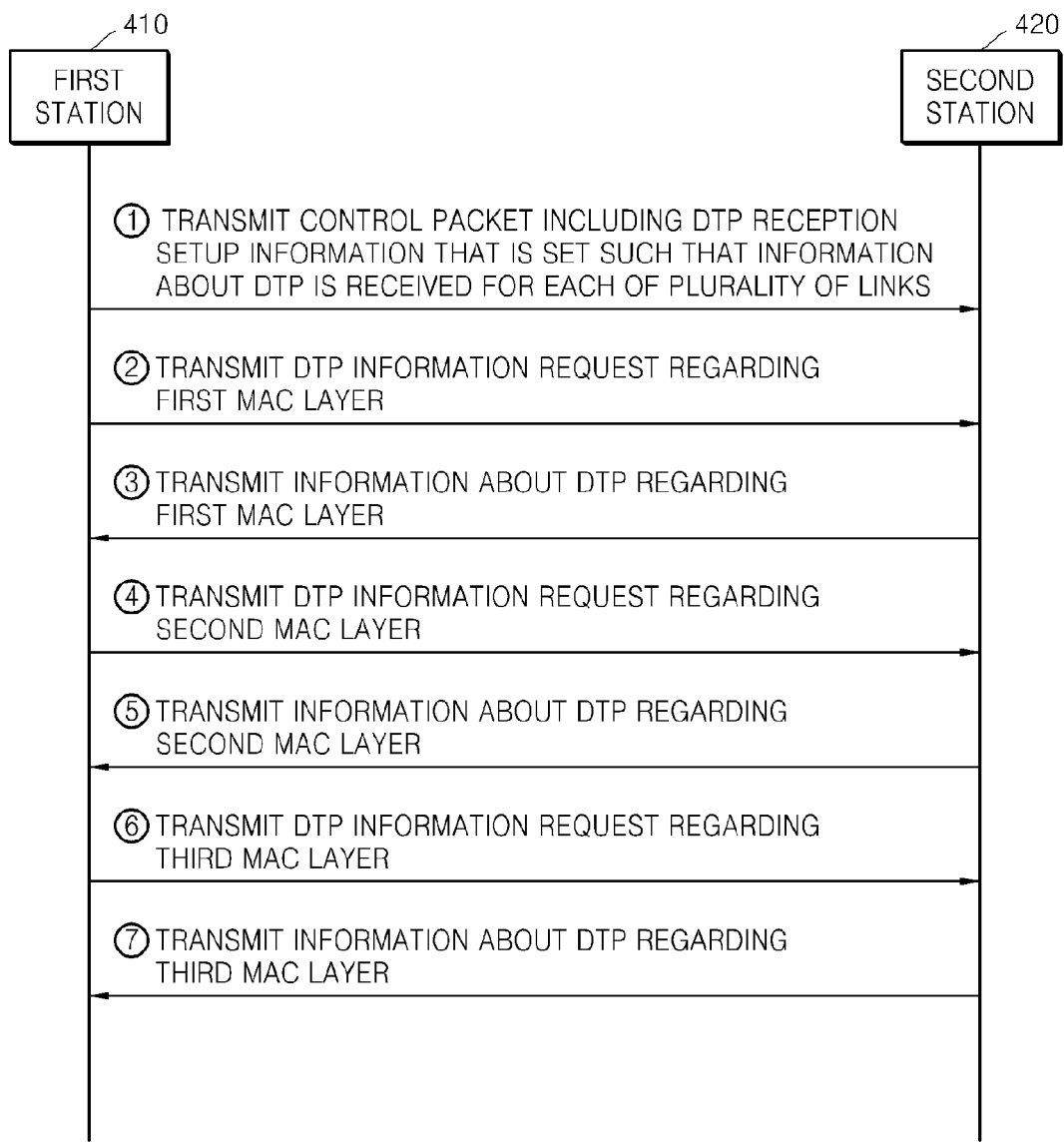
FIG. 4 is a flowchart illustrating a method of reporting dynamic tone pairing (DTP), according to an exemplary embodiment of the present inventive concept.

FIG. 4 is a flowchart illustrating a method of reporting dynamic tone pairing (DTP) according to an exemplary embodiment.

Here, a method in which a first station 410 including three MAC layers receives a DTP report from a second station 420 including a single MAC layer will be described with reference to FIG. 4.

In operation 1, the first station 410 transmits a control packet including DTP reception setup information, which is set to receive information about the DTP for each of the plurality of links, to the second station 420.

In operation 2, the first station 410 transmits a DTP information request regarding a first MAC layer of the first station 410, to the second station 420.

In operation 3, the second station 420 transmits information about the DTP regarding the first MAC layer of the first station, to the first station 410.

According to another exemplary embodiment, the second station 420 may transmit a DTP information response including information about the DTP, to the first station 410.

In operation 4, the first station 410 transmits a DTP information request regarding a second MAC layer of the first station 410, to the second station 420.

In operation 5, the second station 420 transmits information on the DTP regarding the second MAC layer of the first station, to the first station 410.

In operation 6, the first station 410 transmits a DTP information request regarding a third MAC layer of the first station 410, to the second station 420.

In operation 7, the second station 420 transmits information on the DTP regarding the third MAC layer of the first station, to the first station 410.

As described above, referring to FIG. 4, the first station 410 transmits a DTP information request regarding each of its MAC layers based on the DTP reception setup information included in the control packet, and receives information about the DTP regarding each of its MAC layers.

Figure 5:
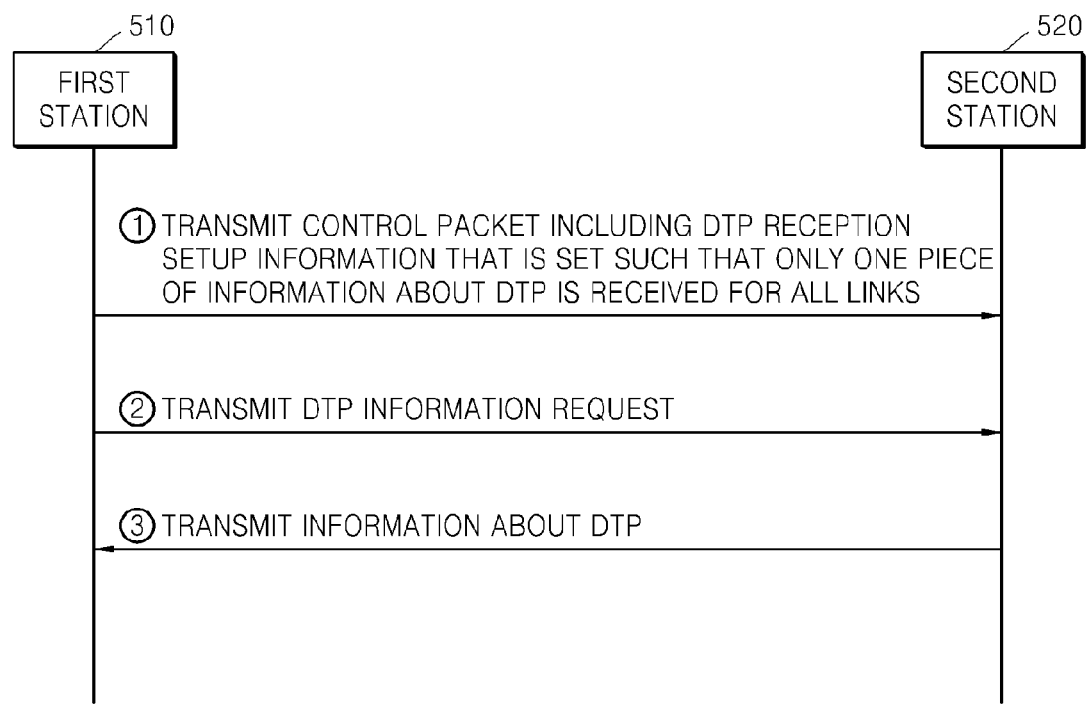
FIG. 5 is a flowchart illustrating a method of reporting DTP, according to another exemplary embodiment.

FIG. 5 is a flowchart illustrating a method of reporting DTP according to an exemplary embodiment.

Here, also, a method in which a first station 510 including three MAC layers receives a DTP report from a second station 520 including a single MAC layer will be described with reference to FIG. 5.

In operation 1, the first station 510 transmits to the second station 520 a control packet including DTP reception setup information that is set such that only one piece of information about DTP is received for all links.

In operation 2, the first station 510 transmits a DTP information request for all MAC layers of the first station 510, to the second station 520.

In operation 3, the second station 520 transmits information about the DTP for all MAC layers of the first station 510, to the first station 510.

According to another exemplary embodiment, the information about the DTP may further include at least one of information about a time when the information about the DTP is transmitted, information about a time when the information about the DTP is generated, and information about a time when the DTP information request is received.

This is for when determining whether to use the information about the DTP which the first station 510 has received previously from the second station 520 because reliability of information decreases as time passes from the time when the information about the DTP that is received by the first station 510 is generated.

As described above, referring to FIG. 5, the first station 510 transmits a DTP information request for all of its MAC layers just once based on the DTP reception setup information included in the control packet, and receives the information about the DTP for all of the MAC layers also just once from the second station 520.

While the first stations 410 and 510 including a plurality of MAC layers transmit a DTP information request to the second stations 420 and 520 and receive information about the DTP from the second stations 420 and 520 in FIGS. 4 and 5, the exemplary embodiment is not limited thereto; the second stations 420 and 520 may transmit a DTP information request to the first stations 410 and 510 including a plurality of MAC layers, and receive information about the DTP generated by the first stations 410 and 510, from the first stations 410 and 510.

Figure 6:
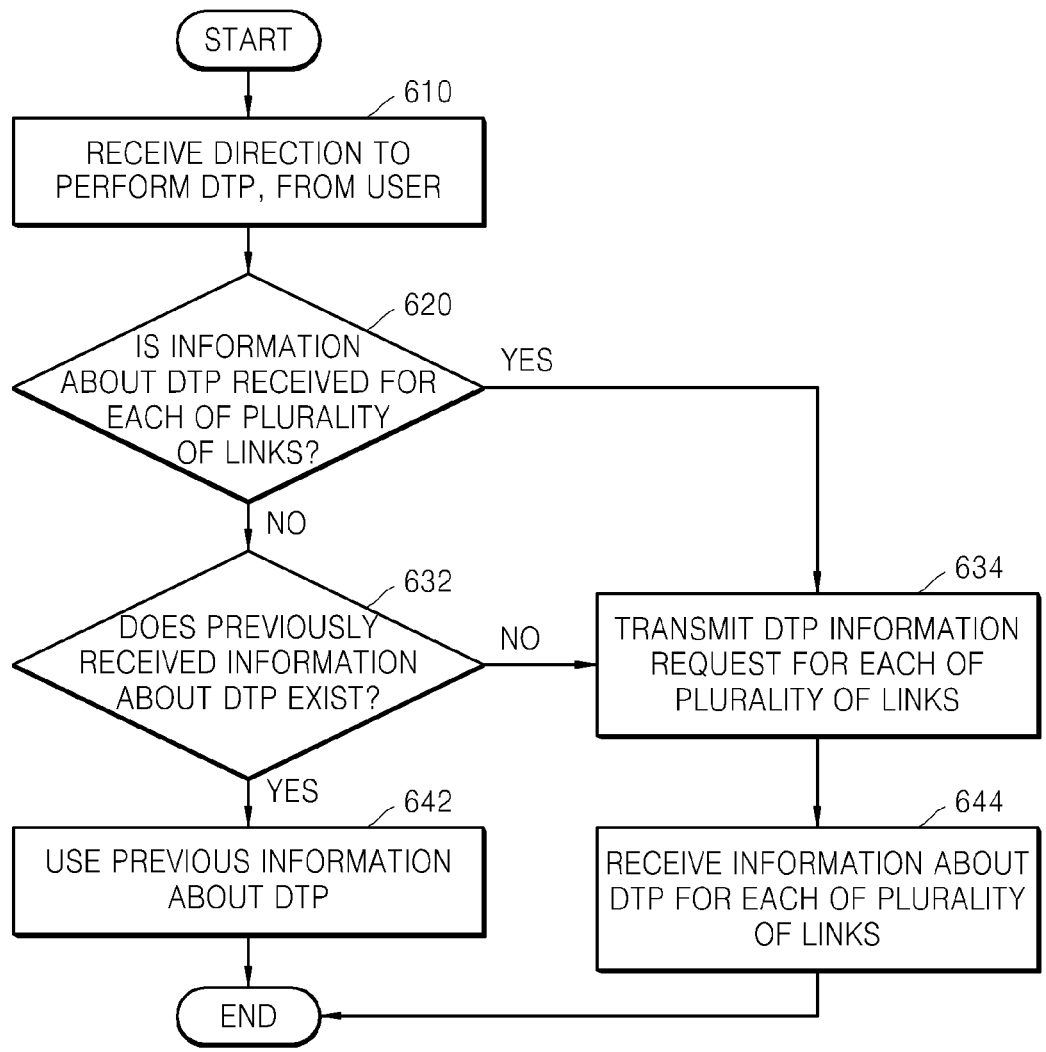
FIG. 6 is a flowchart illustrating a method of using a MMAE, according to an exemplary embodiment.

FIG. 6 is a flowchart illustrating a method of using a multiple MAC address element (MMAE) according to an exemplary embodiment.

In operation 610, a control packet generating apparatus receives an instruction from a user to perform DTP for a plurality of links between the control packet generating apparatus and other apparatuses.

In operation 620, the control packet generating apparatus determines whether information about the DTP is to be received for each of the plurality of links based on DTP reception setup information included in a MMAE stored in the control packet generating apparatus. If it is set to receive the information about the DTP for each of the plurality of links, the method proceeds to operation 634, and if it is not set so, the method proceeds to operation 632.

In operation 632, whether information about the DTP that is received previously exists in the control packet generating apparatus is determined. If it exists, the method proceeds to operation 642, and if not, the method proceeds to operation 634.

If it is set in operation 620 that information about the DTP is received for each of the plurality of links or information about the DTP that is previously received in operation 632 does not exist, the control packet generating apparatus transmits a DTP information request for each of the plurality of links in operation 634.

When information about the DTP that is previously received exists in the control packet generating apparatus in operation 632, the control packet generating apparatus uses the previously received information about the DTP as information about the DTP regarding all of the links of the control packet apparatus in operation 642.

In operation 644, in response to the DTP information request transmitted by the control packet generating apparatus for each of the plurality of links, information about the DTP is received for each of the links in operation 644.

Meanwhile, the method illustrated in FIG. 6 may also be performed not only when information about the DTP is received but also when information about link quality is reported and when beam forming is conducted.

Figure 7:
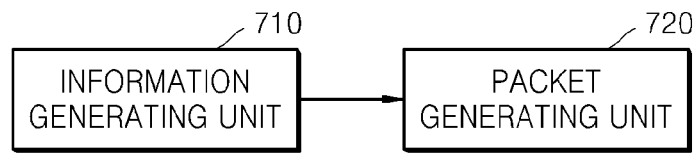
FIG. 7 is a block diagram for explaining a control packet generating apparatus according to an exemplary embodiment.

FIG. 7 is a block diagram for explaining a control packet generating apparatus according to an exemplary embodiment.

Referring to FIG. 7, the control packet generating apparatus includes an information generating unit 710 and a packet generating unit 720.

The information generating unit 710 generates DTP reception setup information indicating whether to receive information about the DTP for each of a plurality of links from other apparatus including at least one MAC layer that is connected to a plurality of MAC layers of the control packet generating apparatus via a plurality of links.

The packet generating unit 720 generates a control packet that includes the DTP reception setup information.

As described above, the control packet may be one of a probe request packet, an association request packet, an announcement packet, and an information response packet.

The control packet generating apparatus according to the exemplary embodiment may preferably further include a transmitting unit (not shown) that transmits a control packet generated by using the packet generating unit 720 or a DTP information request for requesting transmission of the information about the DTP.

Also, the control packet generating apparatus according to the current exemplary embodiment may further include a reception unit (not shown) that receives information about the DTP from other apparatus.

While the method of reporting DTP based on a control packet including DTP reception setup information has been described, hereinafter, a method of reporting DTP based on DTP reception setup that is set inside a device, instead of a control packet, will be described.

Figure 8:
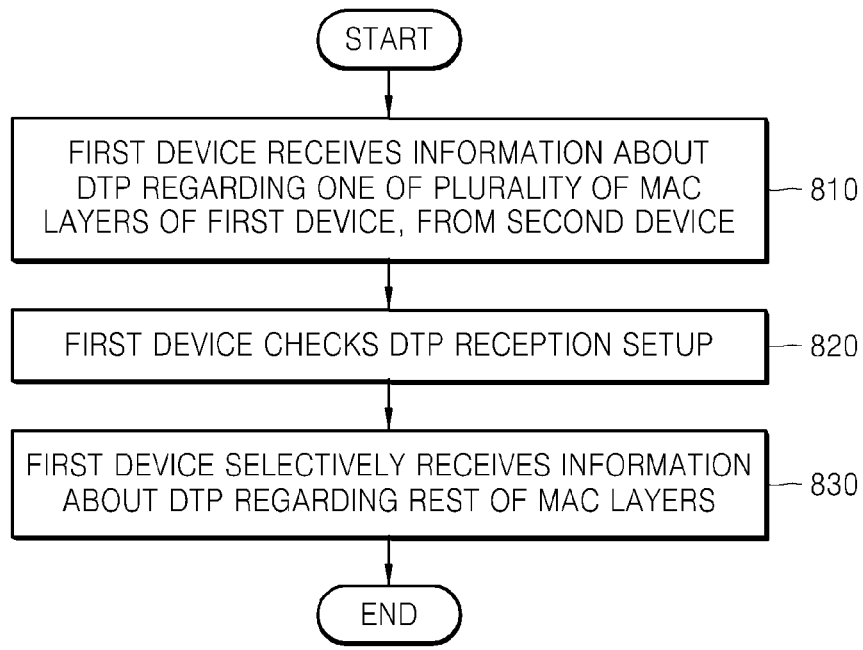
FIG. 8 is a flowchart illustrating a method of receiving information, according to an exemplary embodiment.

FIG. 8 is a flowchart illustrating a method of receiving information according to an exemplary embodiment.

Hereinafter, a method in which a first device which supports the DTP including a plurality of MAC layers receives information about the DTP from a second device will be described with reference to FIG. 8. Here, it is assumed that the second device includes at least one MAC layer that is connected to the plurality of MAC layers of the first device via a plurality of links.

In operation 810, the first device receives information about the DTP regarding one of the plurality of MAC layers of the first device, from the second device.

According to another exemplary embodiment, before operation 810 is performed, a DTP information request for requesting that one of the plurality of MAC layers of the first device transmits information about the DTP may be transmitted to the second device. In this case, the information about the DTP received in operation 810 may be information about the DTP corresponding to the DTP information request.

In operation 820, the first device checks a DTP reception setup indicating whether the first device is to receive information about the DTP for each of the plurality of links of the first device.

For example, the user may store DTP reception setup information indicating a DTP reception setup in the first device, and the first device may check the DTP reception setup later based on the DTP reception setup information.

In operation 830, the first device selectively receives information about the DTP with respect to the rest of the MAC layers based on a result of the checking.

In detail, when the DTP reception setup is set such that the information about DTP is received for each of a plurality of links, the rest of the MAC layers of the first device receive information about DTP generated for each of the plurality of links, and when only one piece of information about DTP is set to be received for all MAC layers, the rest of the MAC layers of the first device do not receive information about the DTP.

Here, each of the MAC layers may receive information about the DTP by transmitting a DTP information request to the second device.

Figure 9:
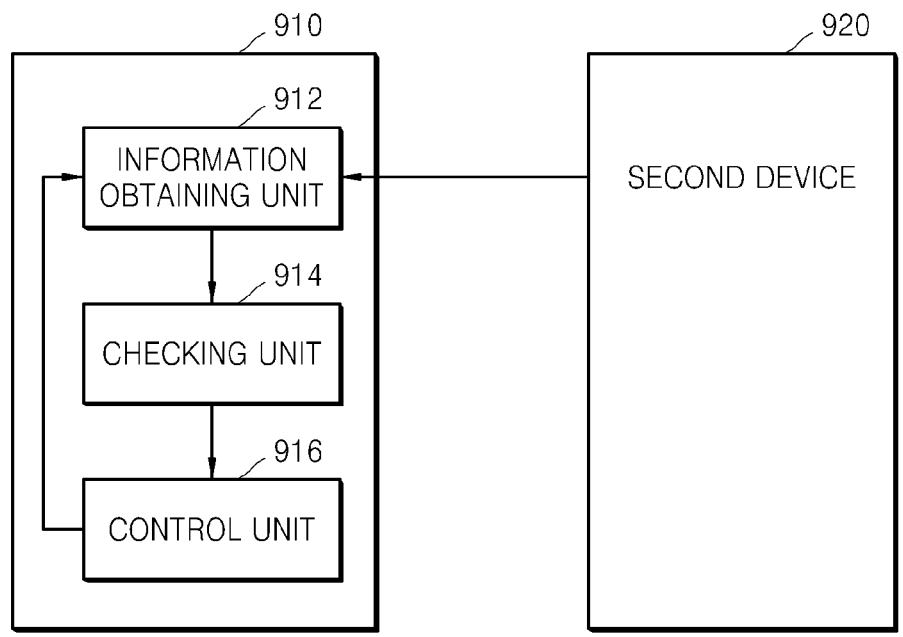
FIG. 9 is a view for explaining an information receiving apparatus according to an exemplary embodiment.

FIG. 9 is a view for explaining an information receiving apparatus 910 according to an exemplary embodiment.

Referring to FIG. 9, the information receiving apparatus 910 includes an information obtaining unit 912, a checking unit 914, and a control unit 916. Here, it is assumed that the information receiving apparatus 910 is mounted in a first device (not shown) that includes a plurality of MAC layers, and a second device 920 is additionally illustrated for convenience of description. Also, it is assumed that the first device and the second device 920 support DTP.

The information obtaining unit 912 receives information about the DTP regarding one of the plurality of MAC layers, from the second device 920.

Here, the information obtaining unit 912 may transmit a DTP information request for requesting transmission of the information about the DTP generated by one of the plurality of MAC layers of the first device, to the second device 920, and may receive information about the DTP by receiving information about the DTP corresponding to the DTP information request, from the second device 920.

When the information about the DTP is received in the information obtaining unit 912, the checking unit 914 checks a DTP reception setup indicating whether to receive information about the DTP for each of the plurality of links.

Here, the checking unit 914 checks the DTP reception setup in order to determine whether to receive information about the DTP regarding the rest of the MAC layers.

Based on a result of the checking of the checking unit 914, The control unit 916 controls the information obtaining unit 912 such that the rest of the MAC layers receive information about DTP generated for each of the plurality of links when the DTP reception setup is set such that the information about the DTP is received for each of the plurality of links.

Also, when the DTP reception setup is set such that only one piece of information about the DTP is received regarding all MAC layers, the control unit 916 controls the information obtaining unit 912 such that the rest of the MAC layers do not receive information about the DTP.

As described above, when the rest of MAC layers do not receive information about the DTP, the one piece of DTP information that is received previously is shared by all MAC layers.

The exemplary embodiments can be written as computer programs and can be implemented in general-use digital computers that execute the programs using a computer readable recording medium.

Examples of the computer readable recording medium include magnetic storage media (e.g., ROM, floppy disks, hard disks, etc.), and optical recording media (e.g., CD-ROMs, or DVDs).

While exemplary embodiments have been particularly shown and described, it will be understood by those of ordinary skill in the art that various changes in form and details may be made therein without departing from the spirit and scope of the inventive concept as defined by the following claims.

What is claimed is:

1. A method of generating a control packet by a first apparatus which supports dynamic tone pairing (DTP) and which communicates with a second apparatus via a plurality of medium access control (MAC) layers, the method comprising:
   generating a control packet including a DTP reception setup information field that enables the second apparatus to determine whether to transmit DTP information for each of the plurality of links or one piece of DTP information for all links to the first apparatus in response to the control packet;
   transmitting the generated control packet by the first apparatus to the second apparatus;
   receiving the DTP information for each of the plurality of links from the second apparatus in response to the DTP reception setup information field indicating to transmit the DTP information for each of the plurality of links; and
   receiving the one piece of DTP information for all the links to the first apparatus from the second apparatus in response to the DTP reception setup information field indicating to transmit the one piece of DTP information.

2. The method of claim 1, wherein if the DTP reception setup information field is set such that the DTP information is to be received for each of the plurality of links, the DTP information generated for each of the plurality of links is received while receiving the DTP information from the second apparatus.

3. The method of claim 1, wherein the DTP reception setup information field includes at least one bit to be interpreted by the second apparatus in determining whether to transmit the DTP information for each of the plurality of links or the one piece of the DTP information for all the links.

4. The method of claim 1, further comprising: transmitting a DTP information request requesting transmission of the DTP information to the second apparatus for each of the plurality of links and receiving the DTP information from the second apparatus for each of the plurality of links, if the DTP reception setup information is set such that the DTP information is to be received for each of the plurality of links.

5. The method of claim 1, further comprising: receiving a DTP information request requesting transmission of the DTP information from the second apparatus for each of the plurality of links, if the DTP reception setup information is set such that the DTP information is to be received for each of the plurality of links; generating the DTP information for each of the plurality of links; and transmitting the generated DTP information for each of the plurality of links to the second apparatus.

6. The method of claim 5, wherein the DTP information further comprises at least one of first information about a first time when DTP information is transmitted, second information about a second time when the DTP information is generated, and third information about a third time when the DTP information request is received.

7. The method of claim 1, wherein the control packet further comprises beam forming information indicating whether to perform beam forming for each of the plurality of links.

8. The method of claim 1, wherein the control packet further comprises link quality report information indicating whether to receive information about link quality for each of the plurality of links from the second apparatus.

9. A non-transitory computer readable recording medium having embodied thereon a program for executing the method of claim 1.

10. A control packet generating apparatus which supports dynamic tone pairing (DTP) and is connectable to other apparatuses via a plurality of medium access control (MAC) layers, the apparatus comprising:
    a computing unit comprising: an information generator configured to generate a DTP reception setup information field that enables one of the other apparatuses to determine whether to transmit DTP information for each of the plurality of links or one piece of DTP information for all links to the control packet generating apparatus in response to the control packet;
    a packet generator configured to generate a control packet including the DTP reception setup information field,
    a transmitter configured to transmit the generated control packet to the one of the other apparatuses; and
    a receiver configured to receive the DTP information for each of the plurality of links from one of the other apparatuses in response to the DTP reception setup information field indicating to transmit the DTP information for each of the plurality of links, and receive the one piece of DTP information for all the links to the first apparatus from the second apparatus in response to the DTP reception setup information field indicating to transmit the one piece of DTP information.

11. The control packet generating apparatus of claim 10, wherein when the DTP reception setup information field is set such that the DTP information is to be received for each of the plurality of links, the DTP information generated for each of the plurality of links is received while the receiver receives the DTP information from the one of the other apparatuses.

12. The control packet generating apparatus of claim 10, wherein the DTP reception setup information field includes at least one bit to be interpreted by the second apparatus in determining whether to transmit the DTP information for each of the plurality of links or the one piece of the DTP information for all the links.

13. The control packet generating apparatus of claim 11, wherein the transmitter transmits a DTP information request for requesting transmission of the DTP information to the one of the other apparatuses for each of the plurality of links and the receiver receives the DTP information from the other apparatus for each of the plurality of links, when the DTP reception setup information field is set such that the DTP information is to be received for each of the plurality of links.

14. The control packet generating apparatus of claim 10, wherein the receiver receives a DTP information request for requesting transmission of the DTP information from the one of the other apparatuses for each of the plurality of links, when the DTP reception setup information field is set such that the DTP information is to be received for each of the plurality of links; and
    the transmitter transmits the generated DTP information for each of the plurality of links to the other apparatus, when the generator generates the DTP information for each of the plurality of links.

15. The control packet generating apparatus of claim 14, wherein the DTP information further comprises at least one of first information about a first time when the DTP information is transmitted, second information about a second time when the DTP information is generated, and third information about a third time when the DTP information request is received.

16. The control packet generating apparatus of claim 10, wherein the control packet further comprises beam forming information indicating whether to perform beam forming for each of the plurality of links.

17. The control packet generating apparatus of claim 10, wherein the control packet further comprises link quality report information indicating whether to receive information about link quality for each of the plurality of links from the one of the other apparatuses.

18. A method of receiving dynamic tone pairing (DTP) information by using a first device which supports DTP and including a plurality of medium access control (MAC) layers from a second device, the method comprising:
    determining whether previously received information about DTP exists;
    determining whether information about the DTP is to be received for each of a plurality of links;
    receiving the DTP information regarding one of the plurality of MAC layers from the second device;
    checking DTP reception setup status to set up a DTP reception setup information field that enables the second device to determine whether to transmit DTP information for each of the plurality of links or one piece of DTP information for all links to the first device in response to a control packet including the DTP reception setup information field;
    selectively receiving the DTP information for each of the plurality of links in response to the DTP reception setup information field indicating to transmit the DTP information for each of the plurality of links; and
    receiving the one piece of DTP information for all the links in response to the DTP reception setup information field indicating to transmit the one piece of DTP information.

19. The method of claim 18, wherein the receiving the DTP information regarding one of the plurality of MAC layers from the second device comprises:
    transmitting to the second device a DTP information request for requesting transmission of the DTP information; and
    receiving the DTP information corresponding to the DTP information request from the second device.

20. The method of claim 18, wherein the selective receiving of the DTP information regarding MAC layers other than the one of the plurality of MAC layers comprises:
    if the DTP reception setup status is set such that the DTP information is to be received for each of a plurality of links, the MAC layers other than the one of the plurality of MAC layers receive the DTP information generated for each of the plurality of links, and
    if the DTP reception setup status is set such that one piece of DTP information is to be received for all MAC layers, the MAC layers other than the one of the plurality of MAC layers do not receive the DTP information.

21. An information receiving apparatus that is mounted in a first device which supports dynamic tone pairing (DTP) and communicates to other devices via a plurality of medium access control (MAC) layers and receives information from a second device, the apparatus comprising:
    an information obtaining circuit configured to obtain DTP information regarding one of the plurality of MAC layers from the second device; and
    a checking circuit configured to determine whether previously received information about DTP exists, determine whether information about the DTP is to be received for each of a plurality of links; and check a DTP reception setup status to set up a DTP reception setup information field that enables the second device to determine whether to transmit the DTP information for each of the plurality of links or one piece of DTP information for all links to the first device in response to a control packet including the DTP reception setup information field; and
    a control circuit configured to control the receiving circuit to receive the DTP for each of the plurality of links in response to the DTP reception setup information field indicating to transmit the DTP information for each of the plurality of links, and control the receiving circuit to receive the one piece of DTP information for all the links in response to the DTP reception setup information field indicating to transmit the one piece of DTP information.

22. The information receiving apparatus of claim 21, wherein the information obtaining circuit is also configured to transmit a DTP information request for requesting transmission of the DTP information to the second device, and receive the DTP information corresponding to the DTP information request from the second device.

23. The information receiving apparatus of claim 21, wherein the control circuit is configured to control the information obtaining circuit to receive the DTP information generated for each of the plurality of links via MAC layers other than the one of the plurality of MAC layers in response to the DTP reception setup status being set such that the DTP information is to be received for each of the plurality of links, and
    wherein the MAC layers, other than the one of the plurality of MAC layers, do not receive the DTP information if the DTP reception setup status is set such that one piece of information about the DTP is to be received for all MAC layers.

24. The information receiving apparatus of claim 21, wherein the control circuit is configured to control the information obtaining circuit such that the rest of the MAC layers do not receive the DTP information if the DTP reception setup status is set such that only one piece of the DTP information is to be received regarding all MAC layers.

25. A method of generating a control packet by a first apparatus which supports dynamic tone pairing (DTP) and which communicates with a second apparatus via a plurality of medium access control (MAC) layers, the method comprising:
    generating a control packet including a DTP reception setup information field that enables the second apparatus to determine whether to transmit DTP information for each of the plurality of links or one piece of DTP information for all links to the first apparatus in response to the control packet;
    transmitting the generated control packet by the first apparatus to the second apparatus;
    and
    receiving the DTP information from the second apparatus in response to the control packet,
    wherein the DTP reception setup information field includes at least one bit to be interpreted by the second apparatus in determining whether to transmit the DTP information for each of the plurality of links or the one pied piece of the DTP information for all the links.

* * * * *